UNITED STATES PATENT OFFICE.

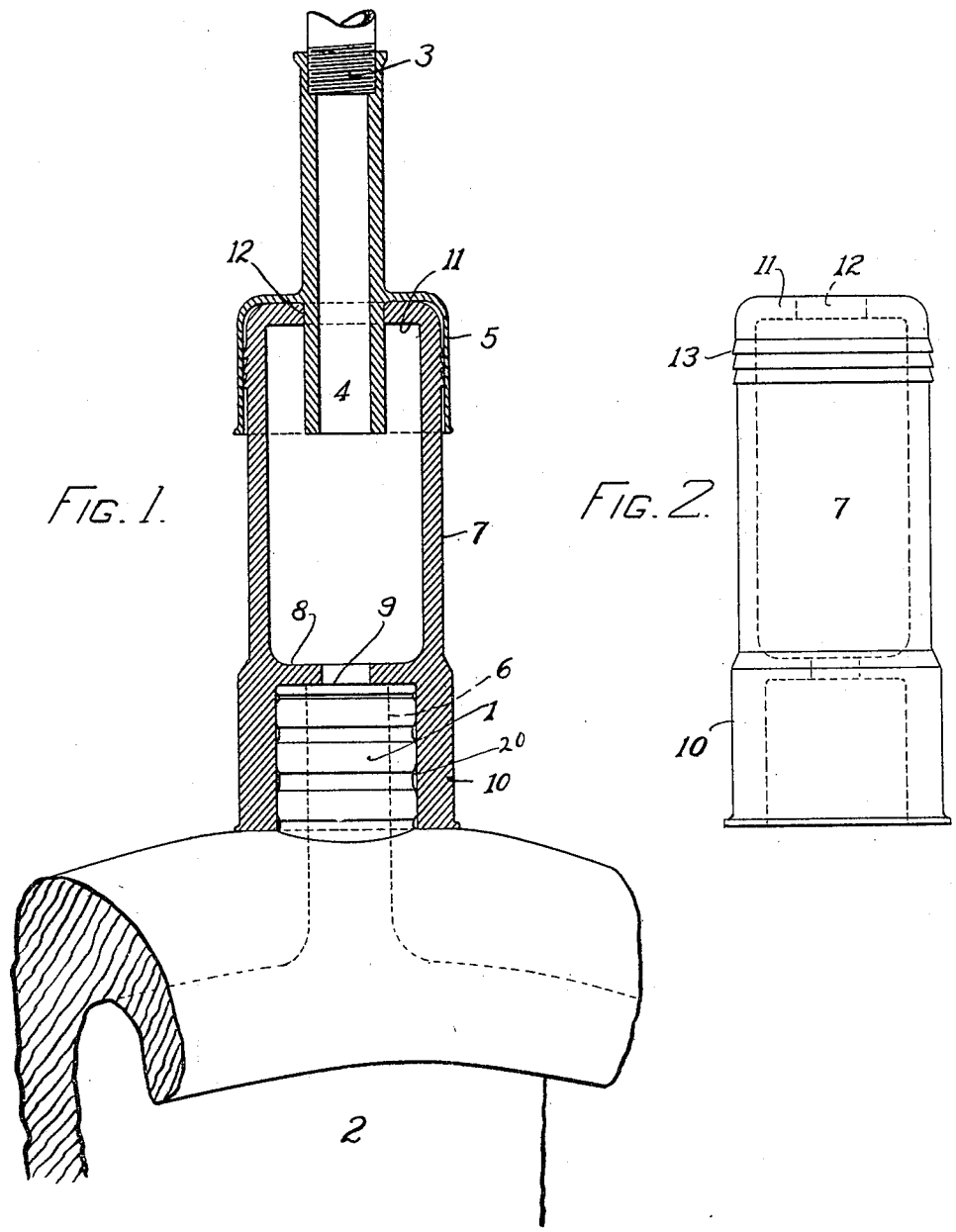

WILLIAM P. DUNN, OF BOSTON, MASSACHUSETTS, ASSIGNOR TO JACOB ALEXANDER, OF BOSTON, MASSACHUSETTS.

FLEXIBLE PIPE-JOINT.

No. 808,026.      Specification of Letters Patent.      Patented Dec. 19, 1905.

Application filed March 6, 1905. Serial No. 248,402.

*To all whom it may concern:*

Be it known that I, WILLIAM P. DUNN, a citizen of the United States, residing at Boston, in the county of Suffolk and State of Massachusetts, have invented certain new and useful Improvements in Flexible Pipe-Joints, of which the following is a specification, reference being had therein to the accompanying drawing.

Heretofore porcelain urinal-bowls have been connected with their water-supply pipes by a rigid joint, and in consequence thereof the bowls are frequently broken, especially when installed on shipboard or on railway-trains and there subject to strains and jars. To overcome this objection, I have produced a new flexible coupling for said or any other desired connection between pipes and conduits.

In the drawing illustrating my invention, 1 is the water-supply conduit of bowl 2; 3, the water-supply pipe; 4, the supply-exit nozzle, and 5 the integral flange exterior to the nozzle 4. Nozzle 4 and its flange 5 are of metal and are commonly known by plumbers as the "bibb." Heretofore nozzle 4 has entered the water-passage 6 in conduit 1 and the space left between the opposed walls of the flange and conduit has been filled with putty to make a tight joint.

My new flexible coupling 7 has a cushioning effect and may be used for connecting any other desired conduits or the like than the conduit-necks 1 of urinal-bowls and their water-supply pipes 3 and 4. It is made of rubber or rubber compound and is a tubular device having an interior circumferential flexible and perforated flange 8, that bears on the end 9 of conduit 1 and is capable of being pressed hard against that end under water-pressure, and thereby make a tight joint between the end of conduit 1 and the under side of flange 8 when the end portion 10 is snapped over conduit 1, the flange 8 being suitably inward from the end of the joint-section. The other end of the pipe-coupling has a transverse exteriorly flattish wall 11, formed with a central perforation 12, through which nozzle 4 extends when this end of the device is inserted and tightly fitted in flange 5. The exterior of device 7 for so much of its length as is received in flange 5 has circumferential ribs 13, that insure a tight joint between the opposed side walls of flexible coupling 7 and the metal flange 5. The interior diameter of my new pipe-coupling is such as to make it fit tightly over conduit 1, while the exterior diameter is such as to make it fit tightly within flange 5, and the diameter of the perforation 12 is such as to cause a tight fit between its wall and the nozzle 4.

My invention may be embodied in various forms other than that shown, if so desired.

It will be plain that the flexible and cushioning pipe-coupling may be readily removed, if desired, for any purpose and that the presence of the joint between any metal pipes and porcelain or similar structures will prevent breaking strain on the latter when the ship is straining or a gun is fired thereon or when a car is under jar or strain. The coupling is useful in many other locations, not only in plumbing, but in other arts.

The supply-exit nozzle 4 and its flange 5 are of metal and preferably integral, as shown. Bowl 2 and its nozzle are usually of porcelain or other frangible material. The exterior of conduit 1 is preferably circumferentially grooved or corrugated, as indicated at 20, to insure by the roughening of the surface a tighter fit of the lower end of the coupling 7 thereon. The exterior of end wall 11 is shaped to make a tight bearing against the opposed inner surface of flange 5.

What I claim is—

1. The combination of a metallic water-supply-exit nozzle provided with an integral inclosing metallic flange; and a water-supply conduit of frangible material; with an intermediate elastic coupling fitting tightly within said flange and having an end wall perforated for passage of said metallic nozzle, and also having an interior perforated flange; below which the water-supply conduit fits tightly into the coupling.

2. The combination of a supply-exit nozzle provided with an integral inclosing flange of a fluid-supply nozzle having a conduit portion exteriorly roughened; and an intermediate flexible coupling an end of which is exteriorly roughened and fitted within said flange; the coupling having an end wall perforated for passage of said exit-nozzle.

3. As a new article of manufacture, an elastic, lengthwise-chambered coupling having a perforated end wall; an exteriorly-roughened surface adjacent to said end wall; and an interior, elastic, centrally-perforated flange.

In testimony whereof I affix my signature in presence of two witnesses.

WILLIAM P. DUNN.

Witnesses:
EDWARD S. BEACH,
THOMAS E. ROTHWELL.